(12) United States Patent
Allen

(10) Patent No.: US 12,213,030 B1
(45) Date of Patent: Jan. 28, 2025

(54) INTERACTIVE ROUTING IN SUPPORT OF EMERGENCY CALL LOCATION DATA

(71) Applicant: 911Inform LLC, Wall Township, NJ (US)

(72) Inventor: Ivo W. Allen, Freehold, NJ (US)

(73) Assignee: 911Inform LLC, Wall Township, NJ (US)

( * ) Notice: Subject to any disclaimer, the term of this patent is extended or adjusted under 35 U.S.C. 154(b) by 0 days.

(21) Appl. No.: 18/788,343

(22) Filed: Jul. 30, 2024

Related U.S. Application Data

(60) Provisional application No. 63/572,006, filed on Mar. 29, 2024.

(51) Int. Cl.
| | |
|---|---|
| H04W 4/029 | (2018.01) |
| G01C 21/20 | (2006.01) |
| H04W 4/16 | (2009.01) |
| H04W 4/90 | (2018.01) |

(52) U.S. Cl.
CPC .......... *H04W 4/029* (2018.02); *G01C 21/206* (2013.01); *H04W 4/16* (2013.01); *H04W 4/90* (2018.02)

(58) Field of Classification Search
CPC ......... H04M 1/72403; H04M 1/72424; H04M 1/72457; H04M 1/72469; H04W 4/024; H04W 4/33
USPC .... 455/404.2, 456.1, 404.1, 466, 411, 456.3, 455/433, 457
See application file for complete search history.

(56) References Cited

U.S. PATENT DOCUMENTS

| | | | |
|---|---|---|---|
| 11,614,332 B2* | 3/2023 | Dasler ............... | G01C 21/206 701/428 |
| 2005/0104745 A1* | 5/2005 | Bachelder ............ | G08G 1/01 340/988 |
| 2007/0194922 A1* | 8/2007 | Nathan ................ | A62B 99/00 340/8.1 |
| 2009/0138353 A1* | 5/2009 | Mendelson .......... | G01S 5/0226 342/463 |
| 2009/0151210 A1* | 6/2009 | Nagatome ........... | G09F 19/22 40/541 |
| 2010/0090856 A1* | 4/2010 | Chen ................... | G08B 7/066 379/40 |
| 2011/0195687 A1* | 8/2011 | Das .................... | H04W 4/024 455/404.1 |
| 2011/0205068 A1* | 8/2011 | Huynh ............... | G07F 17/3227 340/573.1 |

(Continued)

*Primary Examiner* — Joseph Arevalo
(74) *Attorney, Agent, or Firm* — Morse, Barnes-Brown & Pendleton, P.C.; Sean D. Detweiler, Esq.

(57) ABSTRACT

A system for enhancing emergency response capabilities by providing interactive routing for emergencies based on location data within facilities or venues. The system includes interactive maps stored in memory, each featuring floorplans and user interfaces for data input. Potential access and/or escape routes to and/or from the emergency are outlined within the maps. A server, connected to the memory storage, receives location data requests from emergency call routing services. It identifies the caller's location within a facility or venue, accesses the corresponding interactive map, and determines the most efficient access and/or escape route based on the caller's geospatial data and their proximity to the emergency. The system then updates the map with the caller's location and route information before transmitting it to an emergency responder for improved emergency response coordination.

14 Claims, 10 Drawing Sheets

(56) References Cited

U.S. PATENT DOCUMENTS

| | | | | |
|---|---|---|---|---|
| 2016/0205514 | A1* | 7/2016 | Ikeda | H04W 4/043 |
| | | | | 455/456.1 |
| 2018/0123821 | A1* | 5/2018 | Alberth, Jr. | H04W 4/33 |
| 2018/0124178 | A1* | 5/2018 | Alberth, Jr. | H04W 4/90 |
| 2019/0066481 | A1* | 2/2019 | Brown | G08B 27/006 |
| 2019/0145648 | A1* | 5/2019 | Sinha | G08B 21/10 |
| | | | | 219/482 |
| 2020/0070716 | A1* | 3/2020 | Sakata | B60Q 1/50 |
| 2020/0128646 | A1* | 4/2020 | Sinha | H05B 1/028 |
| 2020/0152035 | A1* | 5/2020 | Kim | H04M 1/72424 |
| 2022/0027856 | A1* | 1/2022 | Piaskowski | G06Q 10/105 |
| 2023/0112743 | A1* | 4/2023 | Brown | H04W 4/90 |
| | | | | 455/404.2 |
| 2024/0119201 | A1* | 4/2024 | Foley | G06F 30/13 |

* cited by examiner

INTERACTIVE ROUTING IN SUPPORT OF EMERGENCY CALL LOCATION DATA

CROSS-REFERENCE TO RELATED APPLICATION(S)

This application claims priority to, and the benefit of, U.S. Provisional Application 63/572,006, filed Mar. 29, 2024, for all subject matter common to both applications. The disclosure of said provisional application is hereby incorporated by reference in its entirety.

FIELD OF THE INVENTION

The present invention relates to methods and systems for providing enhanced location data for emergency services calls, such as 911 calls in North America. In particular, the present invention is directed to providing interactive routing, such as access or exit routes and dynamic updates, to those routes based on emergency information in support of location data for emergency services calls.

BACKGROUND

The known system for providing emergency services caller information is limited. E911 (Enhanced 911) is the 911 network functionality available today in North America with equivalent services in other countries. E911 provides two basic lines of location information to the public-safety answering point (PSAP), which is a call center where emergency calls (like police, fire brigade, ambulance) are initiated by any mobile or landline subscriber are received. The PSAP is shown in the example data screen 100 of FIG. 1. The first is Line 1 data 102 and consists of the basic address associated with the specific phone number. The secondary Line 2 information 104 is the data a first responder can use to identify a specific location at the basic address, enabling them to locate the emergency. However, line 2 data 104 is limited to 20 ASCII characters of information and is the information that can be updated to provide additional information. In many cases, these updates can take anywhere from 24-48 hours to go live in the PSAP, and with the severe limit on data size, very little information can be conveyed.

In many emergency call situations, it is beneficial for the first responders, to have as much information about the location of the emergency call as possible. If the location of the emergency call is a site, the first responder would benefit from having a floorplan and room designation for the call. With a conventional system, the first responder must make additional inquiries or arrangements outside of the information provided as part of the emergency call response. For example, to gather all the information about the location, the first responders must get in contact with the building owner or municipality to obtain floorplans of the building and then, after the floorplans are obtained, determine and evaluate potential access or escape routes based on the information at the scene.

The inability of emergency call handling technology to provide more complete and useful location information including floorplans and a route to the emergency, including access and/or escape routes, presents a problem for first responders responding to an emergency call. Increased delays and unnecessary danger for victims and first responders can result from waiting for additional location information, such as floorplans and potential access or escape routes, or can result in the first responders proceeding without the additional information and entering potentially dangerous situations or environments blind.

SUMMARY

There is a need for a technological improvement in the form of a system and method that can provide interactive routing in the form of accurate and useful geospatial physical location information for emergency call first responders including floorplans and a route to the emergency, including access and/or escape routes for a location. The present invention is directed toward further solutions to address this need, in addition to having other desirable characteristics. Specifically, the system and method of the present invention provide a technological solution for providing access or escape routes for a geospatial physical location. The solution further enables real-time routing around obstacles identified at the location. This is a significant improvement over the known system as it is no longer constrained by a 20 ACSII character Response. The present technological advance provides an interactive map that can be present and continuously updated in real time that provides a floorplan and an indicated access and/or escape based on the present situation at the location.

In accordance with embodiments of the present invention, a system for providing an automated determination and production of interactive routing in support of emergency call location data is provided. The system includes one or more interactive maps depicting an interior layout of one or more facilities or venues stored in a memory storage and a server in communication with the memory storage storing the one or more interactive maps. Each interactive map includes one or more floorplans of a facility or venue, a user interface configured to enable a user to view the one or more floorplans and add data to the interactive map, and one or more potential access and/or escape routes for the facility or venue. The server is configured with an automated process to: receive a request, from an emergency call routing service, for location data for an emergency caller; determine geospatial location data for the emergency caller; determine when geospatial location data for the emergency caller corresponds to a facility or venue with an interactive map for its interior layout stored in the memory storage; access the interactive map for the facility or venue and identify one or more access or escape routes using the interactive map by determining a most efficient escape route between the geospatial location data of the emergency caller indicating their physical location and one or more entries into or exits from the facility or venue as indicated by the one or more potential escape routes for the facility or venue added to the interactive map; add the geospatial location data for the emergency caller and identified route to the interactive map; and output the interactive map including the added geospatial location data for the emergency caller and identified route to an emergency responder at the facility or venue.

In accordance with aspects of the present invention, the floorplan of the interactive map comprises a map for each floor of the facility or venue and where an individual floor can be selected and viewed using the user interface.

In accordance with aspects of the present invention, the one or more potential access or escape routes for the facility or venue are added to the interactive map by displaying the one or more floorplans for the facility or venue using the user interface; receiving, from a user via the user interface, routing information indicating paths from one or more rooms to one or more entries or exits on the displayed one or more floorplans of the facility or venue; and saving the received information as one or more potential routes for the interactive map for the facility or venue. In some such aspects, receiving routing information via the user interface comprises a user drawing, via the user interface, one or more lines from one or more rooms to the one or more entries or exits of the displayed one or more floorplans of the facility or venue. In still other aspects, receiving routing information further comprises receiving, from a user via the user interface, identification of one or more entries or exits on the one or more floorplans of the facility or venue.

In accordance with aspects of the present invention, the one or more entries or exits comprise one or more of: doors, windows, and stairways.

In accordance with aspects of the present invention, each interactive map further comprises indications of potential obstacles added using the user interface. In some such aspects, identifying one or more access or escape routes further comprises determining if indications of potential obstacles have been entered on the interactive map and determining the most efficient route based in part on indications of potential obstacles. In other aspects, potential obstacles are added to the interactive map by displaying the one or more floorplans for the facility or venue using the user interface; receiving, from a user via the user interface, an indication of potential obstacles on the displayed floorplan of the facility or venue; and saving the received indication of potential obstacles. In certain aspects, an indication of potential obstacles includes a type of obstacle.

In accordance with aspects of the present invention, the server is further configured to register a facility or venue. In some such aspects, registering a facility or venue comprises providing one or more floorplans for the facility or venue for the interactive map for an interior layout of the facility or venue.

In accordance with aspects of the present invention, the server is further configured to output the interactive map including the added geospatial location data for the emergency caller and identified route to an administrator for the facility or venue.

In accordance with aspects of the present invention, an interactive map including the added geospatial location data for the emergency caller and identified route is outputted in response to a query from the emergency responder.

In accordance with embodiments of the present invention, a method for providing an automated determination and production of interactive routes in support of emergency call location data is provided. The method comprises maintaining one or more interactive maps depicting an interior layout of one or more facilities or venues stored in a memory storage, receiving a request, from an emergency call routing service, for location data for an emergency caller, and initiating an automated process. Each interactive map comprises a floorplan of the facility or venue, a user interface configured to enable a user to view the floorplan and add data to the interactive map, and one or more potential access or escape routes for the facility or venue. The automated process comprises determining geospatial location data for the emergency caller, determining when geospatial location data for the emergency caller corresponds to a facility or venue with an interactive map for its interior layout stored in the memory storage; accessing the interactive map for the facility or venue and identifying one or more access or escape routes using the interactive map by determining a most efficient route between the geospatial location data of the emergency caller indicating their physical location and one or more entries into or exits from the facility or venue as indicated by the one or more potential escape routes for the facility or venue added to the interactive map, adding the geospatial location data for the emergency caller and identified route to the interactive map, and outputting the interactive map including the added geospatial location data for the emergency caller and identified route to an emergency responder at the facility or venue.

In accordance with embodiments of the present invention, a system for providing interactive routing in support of emergency call location data is provided. The system comprises an emergency call routing service, one or more interactive maps for an interior layout of one or more facilities or venues stored in a memory storage, and an enhanced location service provider in communication with the emergency call routing service and the memory storage storing the one or more interactive maps. The emergency call routing service is configured to receive, process, and route emergency call. Each interactive map comprises one or more floorplans of a facility or venue, a user interface configured to enable a user to view the one or more floorplans and add data to the interactive map, and one or more potential access or escape routes for the facility or venue. The enhanced location service provider is configured to receive a request, from the emergency call routing service, for location data for an emergency caller; determine geospatial location data for the emergency caller; determine if geospatial location data for the emergency caller corresponds to a facility or venue with an interactive map for its interior layout stored in the memory storage; access the interactive map for the facility or venue and identify one or more access or escape routes using the interactive map by determining a most efficient escape route between the geospatial location data of the emergency caller indicating their physical location and one or more entries into or exits from the facility or venue as indicated by the one or more potential access or escape routes for the facility or venue added to the interactive map; add the geospatial location data for the emergency caller and identified route to the interactive map; and output the interactive map including the added geospatial location data for the emergency caller and identified route to an emergency responder at the facility or venue.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to systems and methods for providing automated determination and production of routing to emergencies, including access and/or escape routes in support of emergency call location data. By maintaining a database having one or more interactive maps for facilities or venues that include floorplans and potential access and/or escape routes, a location service provider can provide an emergency service system with the interactive map indicating access and/or escape routes in response to a caller location inquiry.

Figure 1:
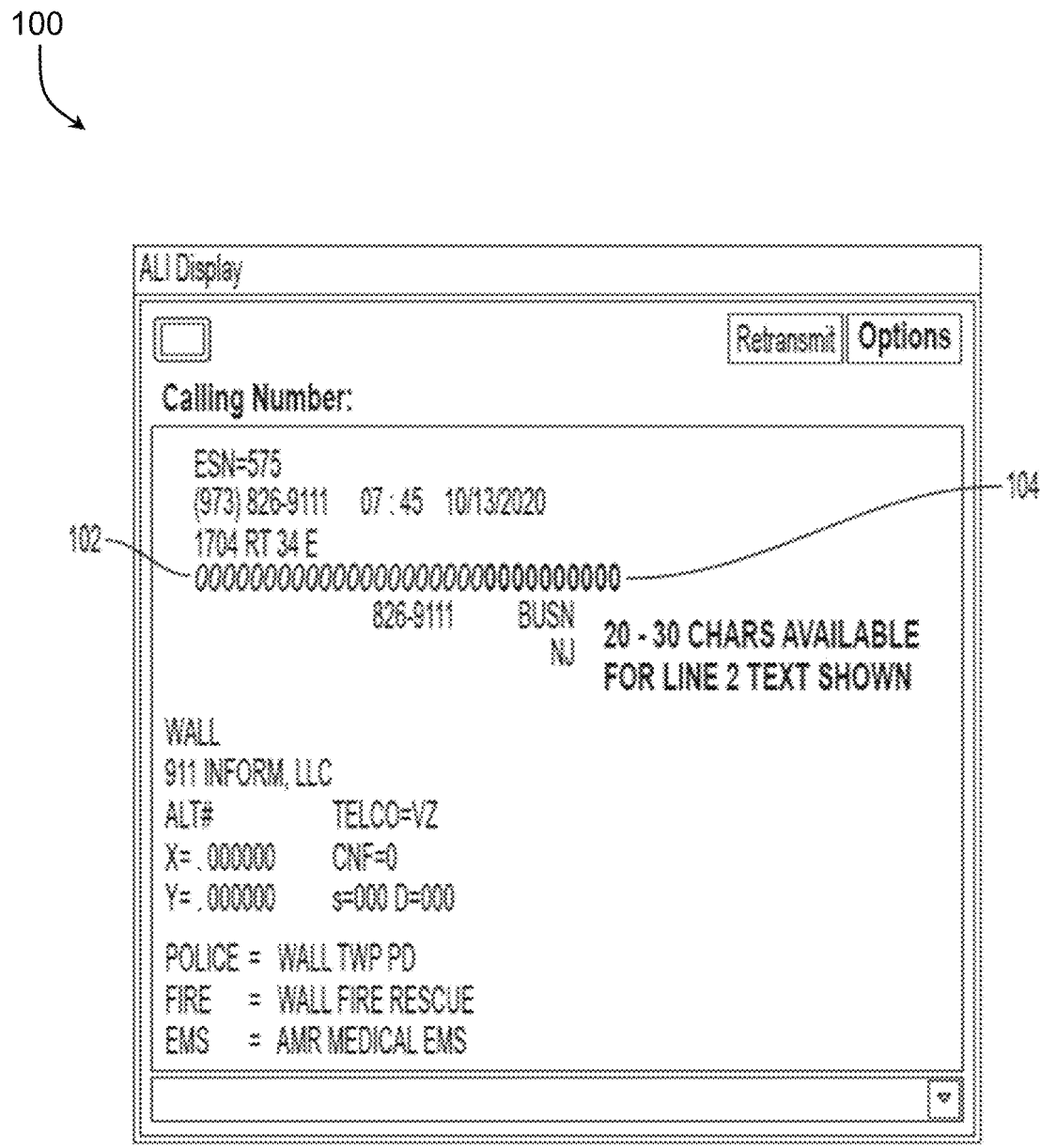
FIG. 1 is an example of a data screen provided by conventional emergency call processing.
Figure 2:
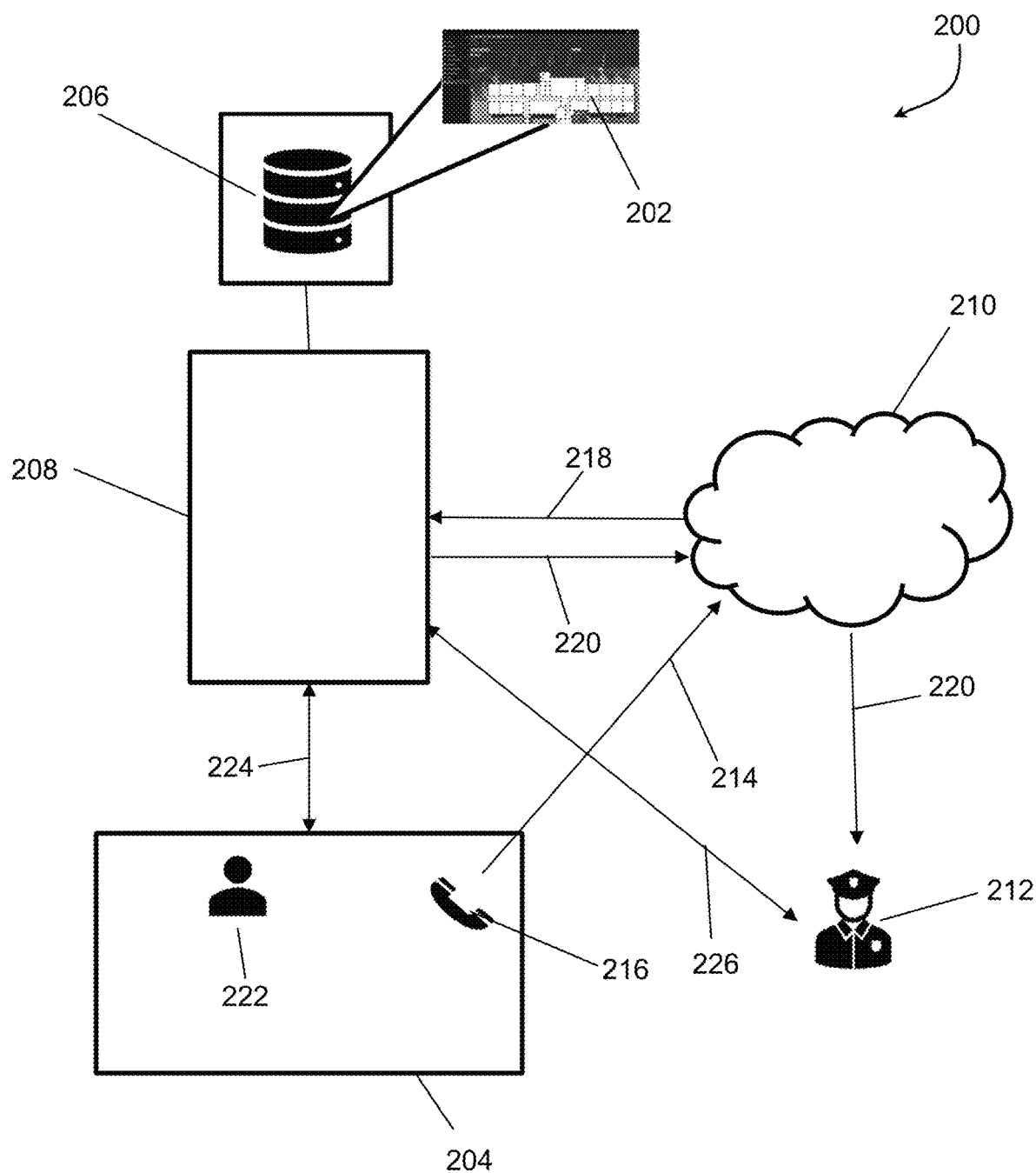
FIG. 2 is an example system for providing access and/or escape routes in support of emergency call processing in accordance with embodiments of the present invention.
Figure 3:
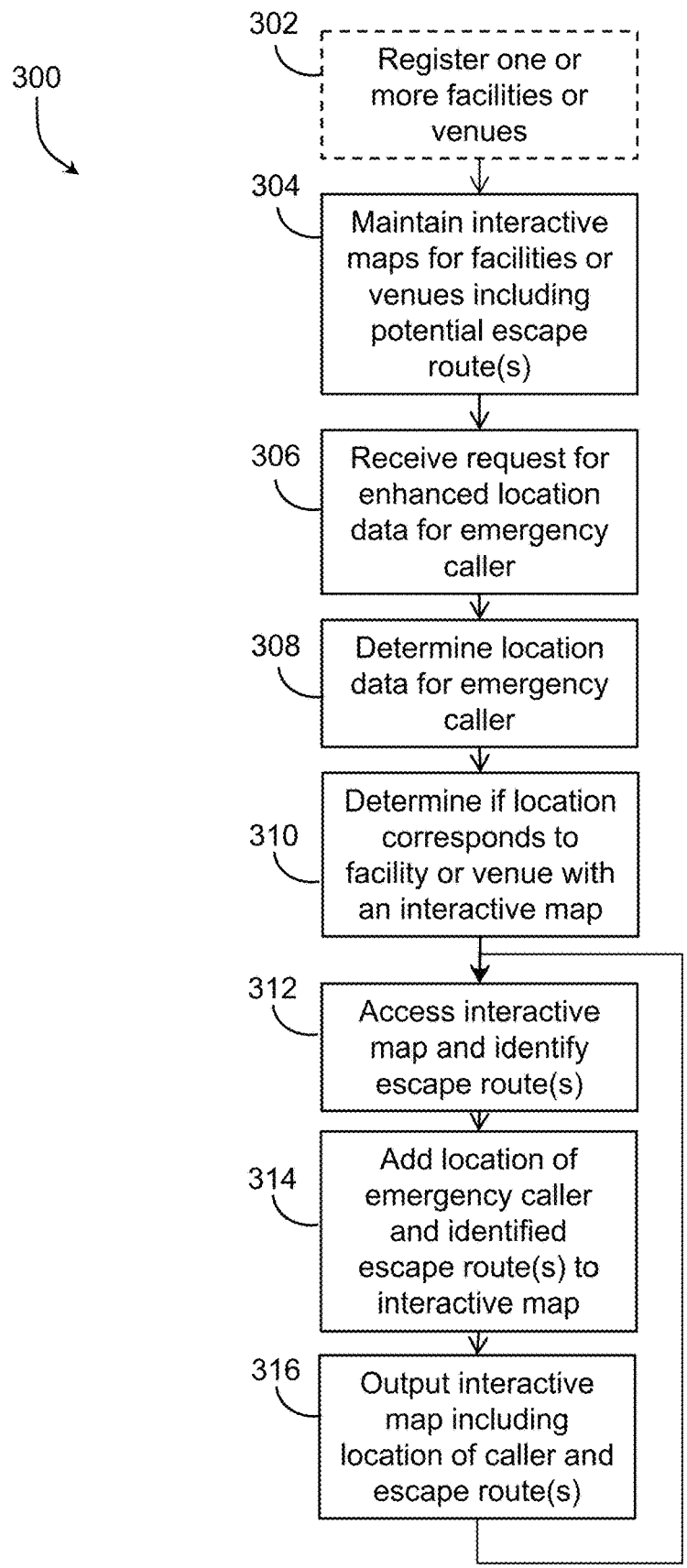
FIG. 3 is an example method for providing access or escape routes in support of emergency call processing in accordance with embodiments of the present invention.
Figure 4:
FIG. 4 is an example of floorplan provided as part of an interactive map in accordance with embodiments of the present invention.
Figure 5:
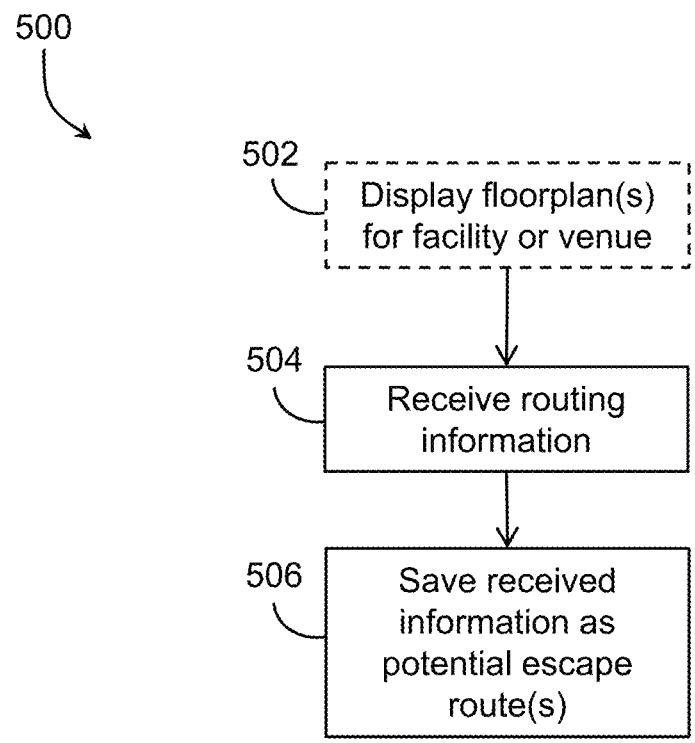
FIG. 5 is an example method for providing routing information for the interactive map in accordance with embodiments of the present invention.
Figure 6:
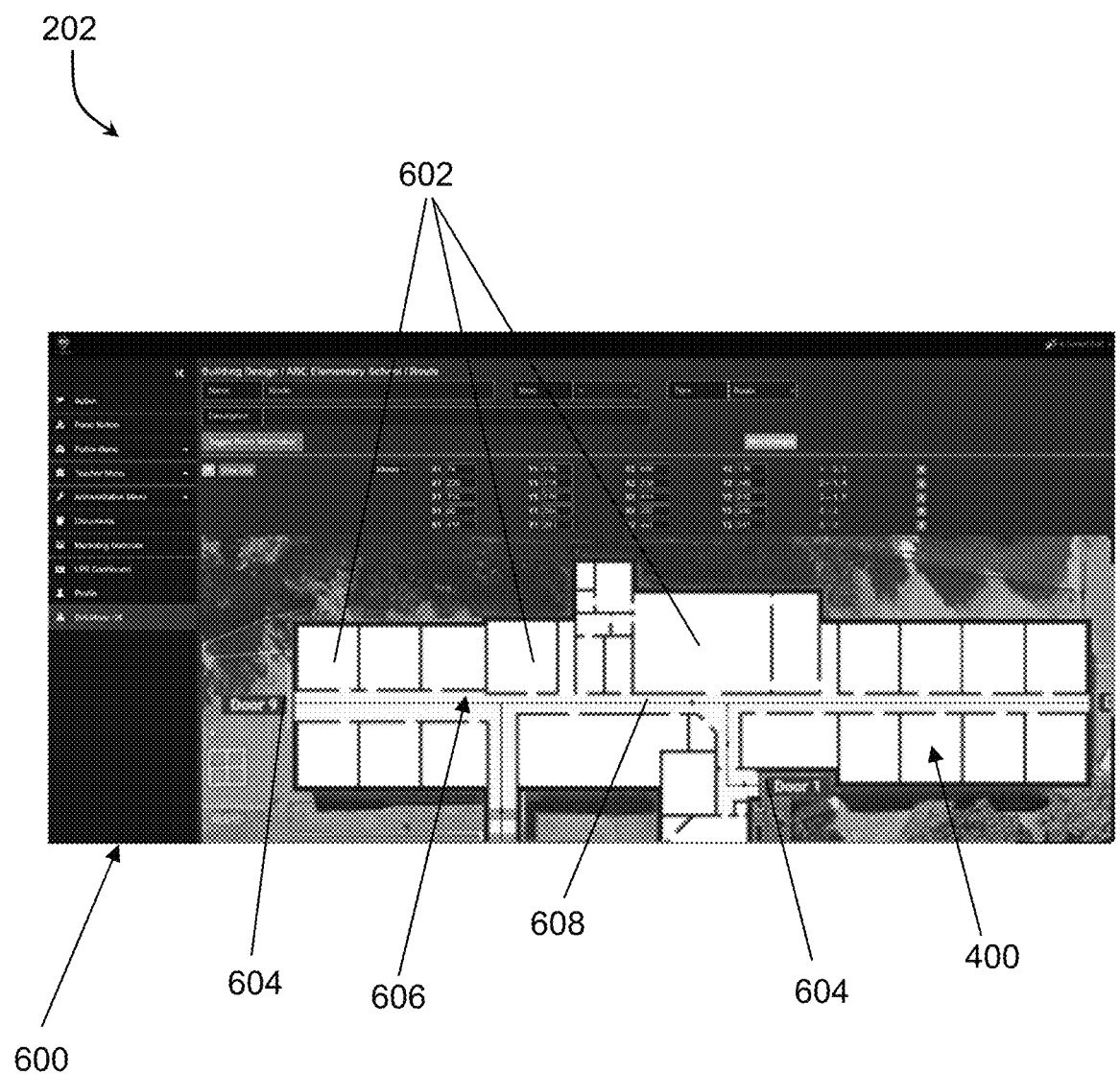
FIG. 6 is an example interactive map to which routing information is added in accordance with embodiments of the present invention.

FIG. 2 through FIG. 10, wherein like parts are designated by like reference numerals throughout, illustrate an example embodiment or embodiments for providing automated determination and production of escape routes in support of emergency call location data, according to the present invention. Although the present invention will be described with reference to the example embodiment or embodiments illustrated in the figures, it should be understood that many alternative forms can embody the present invention. One of skill in the art will additionally appreciate diverse ways to alter the parameters of the embodiment(s) disclosed, such as the size, shape, or type of elements or materials, in a manner still in keeping with the spirit and scope of the present invention. FIG. 2 depicts an example system 200 for implementing the present invention. The system 200 makes use of one or more interactive maps 202 comprising floorplans 400 (as shown in FIG. 4), a user interface 600 (as shown in FIG. 6), and one or more potential access or escape routes 606 (as shown in FIG. 6) corresponding to one or more facilities or venues 204. The one or more interactive maps 202 are stored on a memory storage 206 that is in communication with an enhanced location service provider 208. The system 200 also includes an emergency call routing service 210 in communication with the enhanced location service provider 208 that receives and routes incoming emergency calls and an emergency responder 212 in communication with enhanced location service provider 208 via an application or dedicated console for communicating with the enhanced location service provider 208.

The emergency call routing service 210 may be any entity or organization that receives and processes emergency calls, such as 911 calls. The emergency responder may be police, fire, medical, private security, or any other entity or organization that would respond be notified of or respond to an emergency call, such as a 911 call.

In certain embodiments, the memory storage 206 storing the one or more interactive maps 202 can be part of the enhanced location service provider 208. In other embodiments, such as shown in FIG. 2, the memory storage 206 can be part of a storage solution, such as server, database, data warehouse, or cloud-based storage solution that is separate from the enhanced location service provider 208. The enhanced location service provider 208 can be a server located remotely or be cloud-based. In this embodiment, the one or more client facilities or venues 204 are sites or locations registered with the location service provider 208. The facility or venue 204 may be a building, campus, grounds, or the like.

Figure 9:
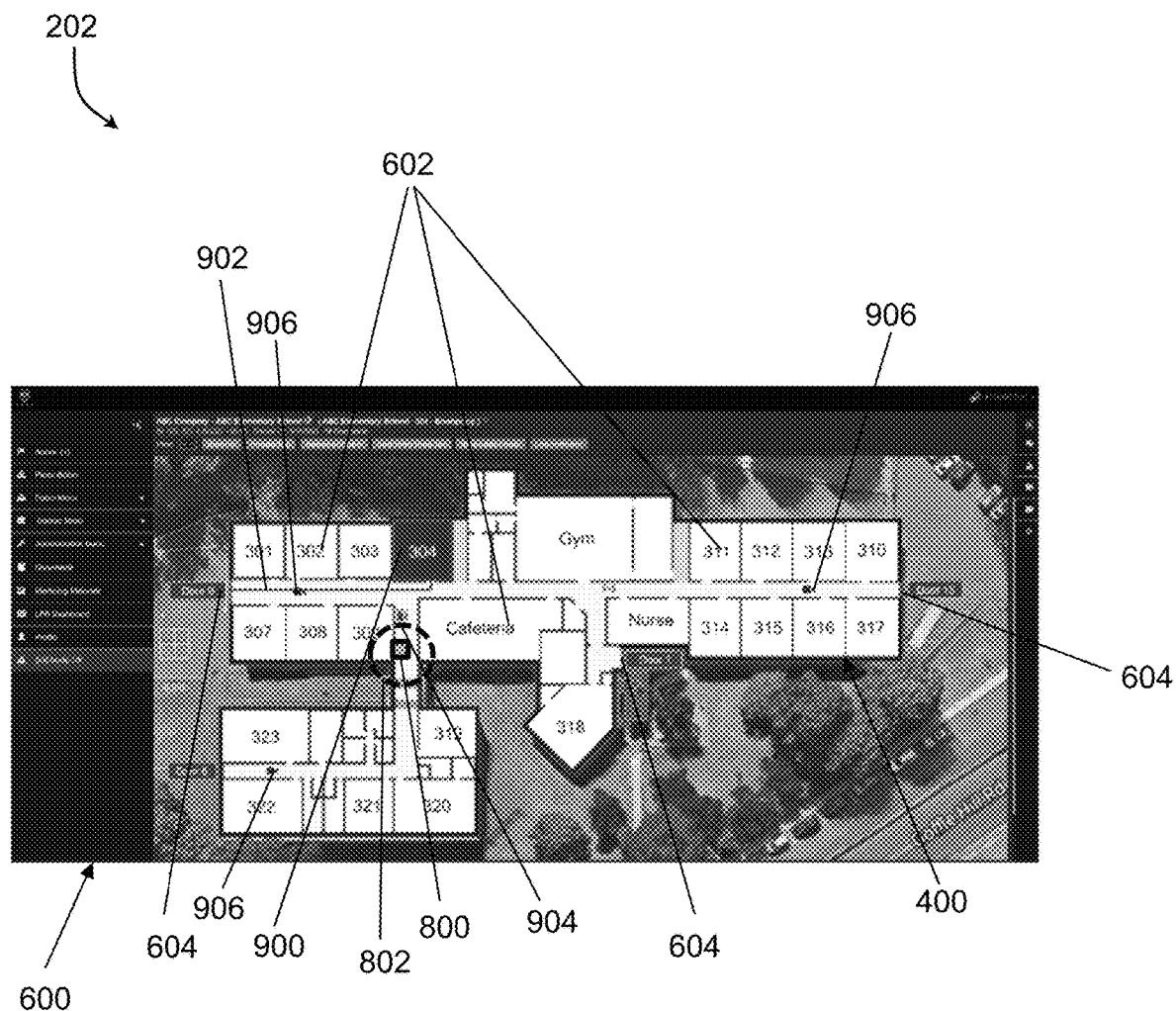
FIG. 9 is an example interactive map showing the location of an emergency caller and identified access and/or escape routes in accordance with embodiments of the present invention.

When the emergency call routing service 210 receives an emergency call 214 from a caller 216, a determination of the physical location of the caller 216 is made. As part of that process, the emergency call routing service 210 can request 218 enhanced physical location data from the enhanced location service provider 208. The enhanced location service provider 208, in turn, provides enhanced physical location data 220 in response to the request 218. If the physical location of the caller 216 is determined to fall within a facility or venue 204 registered with the enhanced location service provider 208 the enhanced physical location data 220 can further provide the interactive map 202 comprising floorplans and potential access or escape routes for the facility or venue 204. The enhanced physical location data 220 as well as the interactive map 202 in turn can be provided to the appropriate emergency responder 212 via an application or dedicated console for communicating with the enhanced location service provider 208. The emergency responder 212 can query for or be dynamically provided 226 the interactive map 202 by the enhanced service locations service provider 208, which may comprise the floorplans 400 and/or identified access or escape routes 902 for the facility or venue 204 (as shown in FIG. 9).

An example of how the components of FIG. 2 interact can be seen in FIG. 3 FIG. 3 is a high-level methodology 300 for providing enhanced location data for emergency calls including access to any escape routes at the facility or venue 204.

Referring now to the method 300 of FIG. 3, In certain embodiments, one or more facilities or venues 204 are registered with the enhanced location service provider 208 (Step 302). Then one or more one or more interactive maps 202 are maintained for one or more facilities or venues 204 registered with the enhanced location service provider 208 (Step 304). The one or more interactive maps 202 are for an interior layout of the one or more facilities or venues 204. Each interactive map 202 comprises one or more floorplans 400 for the facility or venue 204, a user interface 600 allowing viewing of the floorplans 400 and interaction with the interactive map 202, and one or more potential access or escape routes 606. The method then proceeds when a request 218 for enhanced location data for an emergency call 214 from a caller 216 is received (Step 306). This initiates an automatic response. The location data for the emergency caller 216 is then determined (Step 308). When the physical location of the caller 216 corresponds to a facility or venue 204 with an interactive map 202 (Step 310), the corresponding interactive map is accessed, and one or more access or escape routes are identified (Step 312). The geospatial location of the emergency caller 216 and the identified one or more routes are then added to the interactive map 202 (Step 314). The interactive map 202 including the geospatial location of the caller 216 and the identified one or more routes 902 are then produced and outputted (Step 316) to the emergency responder 212 either dynamically or in response to a query 226 via an application or dedicated console for communicating with the enhanced location service provider 208.

In certain embodiments, when registering a facility or venue 204 an administrator 222, such as an owner or manager of the facility or venue 204 may provide information regarding the facility or venue 204 to the enhanced location service provider 208, such as name, location, etc. In certain embodiments, the administrator 222 (or their organization with which they are in some way associated, or the manager of the facility or venue 204) may submit one or more floorplans 400, such as seen in FIG. 4. In other embodiments, the enhanced location service provider 208 generates or otherwise obtains a one or more floorplans 400 based on the information provided by the administrator 222. The interaction 224 between the enhanced location service provider 208 and the administrator 222 can be performed using a browser, website, interface, or application operating on a personal computing device of the administrator 222. Such interaction 224 can further be used to update and maintain the interactive maps 202 (Step 304)

In certain embodiments, this interaction 224 includes providing a user interface. The user interface is configured to enable a user, such as an administrator 222 or emergency responder 212 to upload and/or view the one or more floorplans 400 and add data to the interactive map 202. An example of the data that can be added to the interactive map 202 includes one or more potential access or escape routes 606 for the facility or venue 204. Examples of this can be seen in FIG. 5 and FIG. 6.

FIG. 5 depicts an example method 500 for adding or updating potential access or escape routes to the interactive map that may occur during registration (Step 302) or the maintenance of the interactive map 202 (Step 304). FIG. 6 depicts the corresponding interactive map 202.

The method 500 includes displaying the one or more floorplans 400 for the facility or venue 204 using the user interface 600 of the interactive map 202 (Step 502), receiving, via the user interface 600, routing information indicating paths between one or more rooms 602 to one or more entries or exits 604 on the displayed one or more floorplans 400 of the facility or venue 204 from the user, such as administrator 222 (Step 504), and saving the received information as one or more potential routes 606 for the interactive map 202 for the facility or venue 204 (Step 506).

In certain embodiments, receiving routing information (Step 504) comprises the user, such as administrator 222 drawing, via the user interface 600, one or more lines 608 from one or more rooms 602 to the one or more entries or exits 604. In some certain embodiments, the administrator 222 may also identify the one or more rooms 602 and/or entries/exits 604 using the user interface 600. In other embodiments, rooms 602 and/or entries/exits 604 may be previously identified as part of the floorplan 400. Examples of identifiable entries or exits include doors, windows, and stairways. In some embodiments where multiple floorplans 400 exist for a facility or venue 204 representing multiple floors of the facility or venue 204, the stairways may be linked across multiple maps, such a route leading to a stairway may transfer or otherwise continue from one floor to the next to and eventually to an entry into or exit out of the facility or venue 204. In some further embodiments, the interactive map 202 can also include indications of potential obstacles 800 (as shown in FIG. 8) such as a hazard or threat added using the user interface 600. Examples of this can be seen in FIG. 7 and FIG. 8.

Figure 7:
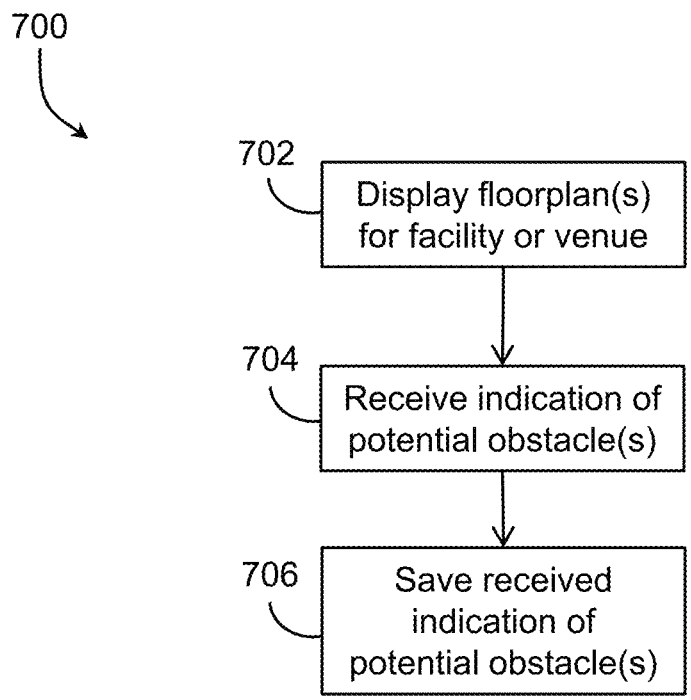
FIG. 7 is an example method for providing an indication of obstacles for the interactive map in accordance with embodiments of the present invention.
Figure 8:
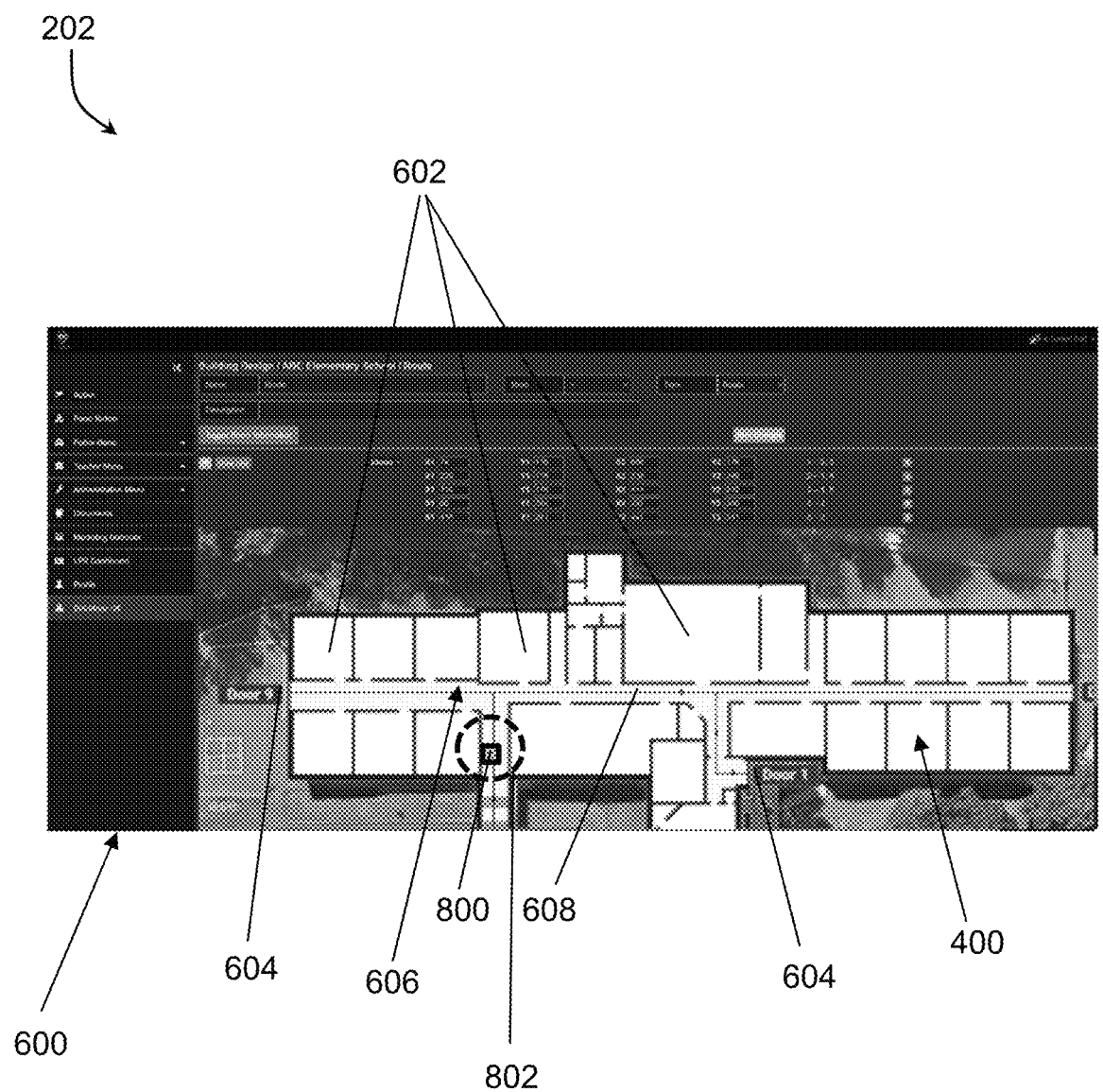
FIG. 8 is an example interactive map to which routing information is added in accordance with embodiments of the present invention.

FIG. 7 depicts an example method 700 for adding or updating potential obstacles 800 to the interactive map that may occur during registration (Step 302) or the maintenance of the interactive map 202 (Step 304). FIG. 8 depicts the corresponding interactive map 202.

The method 700 includes displaying the one or more floorplans 400 for the facility or venue 204 using the user interface 600 of the interactive map 202 (Step 702), receiving, via the user interface 600, an indication of potential obstacles 800, such as a hazard or threat, on the displayed one or more floorplans 400 of the facility or venue 204 from the administrator 222 or emergency responder 212 (Step 704), and saving the received indication of potential obstacles 800 for the interactive map 202 for the facility or venue 204 (Step 706). In some embodiments, the administrator 222 or emergency responder 212 may further be able to indicate the type of obstacle 800 such as fire, water, smoke, gas debris, collapsed floor, hostile individual, etc. For example, the obstacle may be color coded (e.g., orange indicating fire). In other embodiments, the obstacle 800 may be clickable or otherwise selectable to indicate the obstacle type. In some embodiments, the obstacle may have a bounding circle 802 defined by a radius length that will influence rerouting of any paths that would intersect any point in the circle 802. The radius for this circle 802 can be set by the user, such as the administrator 222 or emergency responder 212 or be predefined by the type of obstacle 800. Other color or identification mechanisms will be apparent to one skilled in the art given the benefit of this disclosure. It should also be noted that adding indications of obstacles 800 to the interactive maps 202 can also be performed by the emergency responder 212 at the facility or venue 204, the administrator 222, or any other operator based on information available at the time using the user interface 600 provided as part of the interactive map 202 accessible by the administrator 222, other operator, or provided to the emergency responder 212.

Referring back to FIG. 3, with one or more facilities or venues 204 registered (Step 302) and interactive map updated or otherwise maintained (Step 304), when a request 218 for enhanced location data for an emergency call 214 from a caller 216 is received from the call routing service 210 (Step 306), the location data for the emergency caller 216 can then be determined (Step 308).

The enhanced geospatial physical location data 220 can include one or more of a country indication, a state indication, a street address, Global Positioning System (GPS) coordinates, a floor designation, and a room designation. In certain embodiments, an elevation or altitude can be provided, where a positive altitude is above sea-level, and a negative altitude is below sea-level.

If the geospatial physical location of the caller 216 corresponds to a facility or venue 204 with an interactive map 202 (Step 310), the corresponding interactive map 202 is accessed and one or more access and/or escape routes are identified (Step 312). Identifying the one or more access and/or escape routes 902 using the interactive map is performed by determining a most efficient e route 606 between the geospatial physical location data of the emergency caller 216 indicating their physical location 900 (as shown in FIG. 9) and one or more entries or exits 604 of the facility or venue 204 as indicated by the one or more potential access and/or escape routes 606 for the facility or venue 204 added to the interactive map 202 as shown in FIG. 6.

In certain embodiments, identifying the one or more access or escape routes (Step 312) further comprises determining if indications of potential obstacles 800 have been entered on the interactive map 202 such as shown in FIG. 8 and determining the most efficient route based in part on indications of potential obstacles 800.

The geospatial location 900 of the emergency caller 216 and the identified one or more routes 902 are then added to the interactive map 202 (Step 314). An example of this can be seen in FIG. 9.

Interactive map 202 of FIG. 9 shows the geospatial location 900 of the emergency caller 216 and the identified one or more routes 902. Here the geospatial location 900 of the caller is shown as being in "room #304" of the floorplan 400 as indicated by being highlighted or otherwise colored. The identified route 902 can be indicated using a highlighted or colored line. In certain embodiments, such as shown here, the interactive map 202 may further include indications of fire/emergency resources 904, and surveillance video 906. If there is remotely accessible surveillance video 906 at the facility or venue 204, access to the remotely accessible surveillance video 906 may also be provided as part of the interactive map 202. Other indicators and features will be apparent to one skilled in the art given the benefit of this disclosure.

The interactive map 202 including the geospatial location 900 of the caller 216 and the identified one or more routes 902 are then outputted (Step 316) and provided to the emergency responder 212 in addition to the enhanced location data 220 provided to the emergency call routing service 210. The interactive nature of the interactive map allows the responder 212 at the facility or venue 204, the administrator 222, or any other operator to update the interactive map 202 based on information available at the time using the user interface 600 provided as part of the interactive map 202. The identification of the route 902 and location 900 of the caller 216 can then be updated based on the newly added information.

In certain embodiments, the enhanced location service provider 208 can provide additional functionality. For example, the enhanced location service provider 208 can send a notification to security personal or the administrator 222 of the facility or venue 204 coinciding with the geospatial physical location 900 of the emergency caller 216.

Figure 10:
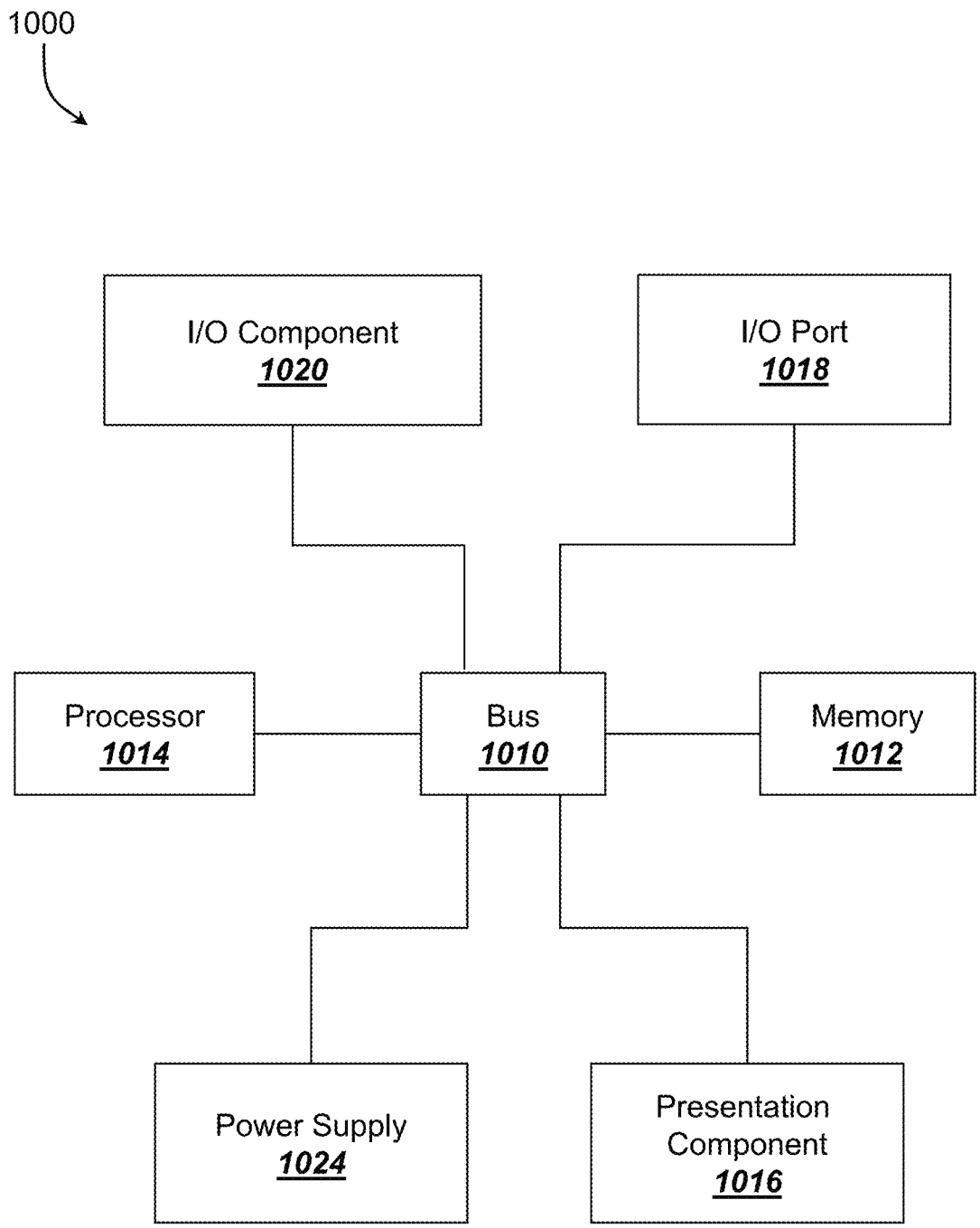
FIG. 10 is a diagrammatic illustration of a high-level architecture configured for implementing processes in accordance with aspects of the invention.

One illustrative example of a computing device 1000 used to provide the functionality of the present invention, such as provided by the interactive map 202, memory storage 206, location service provider 208, emergency call routing service 210, or a personal computing device of an administrator 222 or emergency responder 212. The computing device 1000 is merely an illustrative example of a suitable special-purpose computing environment and in no way limits the scope of the present invention. A "computing device," as represented by FIG. 10, can include a "workstation," a "server," a "laptop," a "desktop," a "hand-held device," a "mobile device," a "tablet computer," or other computing devices, as would be understood by those of skill in the art. Given that the computing device 1000 is depicted for illustrative purposes, embodiments of the present invention may utilize any number of computing devices 1000 in any number of different ways to implement a single embodiment of the present invention. Accordingly, embodiments of the present invention are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014, one or more presentation components 1016, input/output ports 1018, input/output components 1020, and a power supply 1024. One of skill in the art will appreciate that the bus 1010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 10 is merely illustrative of an exemplary computing device that can be used to implement one or more embodiments of the present invention, and in no way limits the invention.

The computing device 1000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, and the like. The computing device 1000 can include one or more processors 1014 that read data from components such as the memory 1012, the various I/O components 1016, etc. Presentation component(s) 1016 present data indications to a user or other device. Exemplary presentation components include a display device, speaker, printing component, vibrating component, etc.

The I/O ports 1018 can enable the computing device 1000 to be logically coupled to other devices, such as I/O components 1020. Some of the I/O components 1020 can be built into the computing device 1000. Examples of such I/O components 1020 include a camera, microphones, joystick, recording device, game pad, satellite dish, scanner, printer, wireless device, networking device, and the like.

The power supply 1024 can include batteries. Other suitable power supply or batteries will be apparent to one skilled in the art given the benefit of this disclosure.

The disclosed embodiments of the present invention provides automated determination and production of interactive access or escape routes in support of geospatial physical location data for emergency services calls. The system and method establish access or escape routes for registered facilities and venues. The access or escape routes for a facility or venue are maintained in an interactive map which can then be accessed, provided, or otherwise consulted to provide enhanced geospatial physical location data for an emergency call including access and/or escape routes if a geospatial physical location of an emergency caller overlaps with a facility or venue having an interactive map. Thus, the system provides enhanced geospatial physical location functionality as the geospatial physical location data including access and/or escape routes provided is more robust and readily available than what was previously provided in conjunction with emergency calls. The present invention provides the technology enabling a practical solution of providing emergency responders any other emergency workers with substantially more accurate geospatial location information pinpointing the exact origins of an emergency caller, and additionally provides the technology for indicating access and/or escape routes for a facility or venue that is also the origin of the emergency call. With the technology of the present invention, the emergency responders and other emergency workers are transformed from having a general building address of an emergency caller, to a specific room or other enhanced geospatial location along with access and/or escape routes for that call origin location. Prior technology of emergency call handling was incapable of providing this functionality. The enhanced geospatial location data provided by the present invention saves the emergency responder time and prevents unnecessary danger as the emergency responder does not have to separately obtain the floorplan and determine access and/or escape routes at the facility or venue or proceed without the additional information and enter a potentially dangerous situation or environment blind.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A system for providing an automated determination and production of interactive routing in support of emergency call location data, the system comprising:
   one or more interactive maps depicting an interior layout of one or more facilities or venues stored in a memory storage, each interactive map comprising:
   one or more floorplans of a facility or venue;
   a user interface configured to enable a user to view the one or more floorplans and add data to the interactive map; and
   one or more potential access or escape routes for the facility or venue; and a server in communication with the memory storage storing the one or more interactive maps, the server configured with an automated process to:
   receive a request, from an emergency call routing service, for location data for an emergency caller;
   determine geospatial location data for the emergency caller;
   determine when geospatial location data for the emergency caller corresponds to a facility or venue with an interactive map for its interior layout stored in the memory storage;
   wherein each interactive map further comprises indications of potential obstacles added using the user interface;
   wherein potential obstacles are added to the interactive map by: displaying the one or more floorplans for the facility or venue using the user interface; receiving, from a user via the user interface, an indication of potential obstacles on the displayed floorplan of the facility or venue; and saving the received indication of potential obstacles;
   access the interactive map for the facility or venue and identify one or more access or escape routes using the interactive map by determining a most efficient escape route between the geospatial location data of the emergency caller indicating their physical location and one or more entries or exits of the facility or venue as indicated by the one or more potential access or escape routes for the facility or venue added to the interactive map;
   add the geospatial location data for the emergency caller and identified route to the interactive map; and
   output the interactive map including the added geospatial location data for the emergency caller and identified route to an emergency responder at the facility or venue.

2. The system of claim 1, wherein the floorplan of the interactive map comprises a map for each floor of the facility or venue and where an individual floor can be selected and viewed using the user interface.

3. The system of claim 1, wherein the one or more potential access or escape routes for the facility or venue are added to the interactive map by:
   displaying the one or more floorplans for the facility or venue using the user interface;
   receiving, from a user via the user interface, routing information indicating paths between one or more rooms to one or more entries or exits on the displayed one or more floorplans of the facility or venue; and saving the received information as one or more potential access or escape routes for the interactive map for the facility or venue.

4. The system of claim 3, wherein receiving routing information via the user interface comprises:
a user drawing, via the user interface, one or more lines between one or more rooms to the one or more entries or exits of the displayed one or more floorplans of the facility or venue.

5. The system of claim 3, wherein receiving routing information further comprises:
receiving, from a user via the user interface, identification of one or more entries or exits on the one or more floorplans of the facility or venue.

6. The system of claim 1, wherein the one or more entries or exits comprise one or more of: doors, windows, and stairways.

7. The system of claim 1, wherein identifying one or more escape routes further comprises: determining if indications of potential obstacles have been entered on the interactive map and determining the most efficient route based in part on indications of potential obstacles.

8. The system of claim 1, where an indication of potential obstacles includes a type of obstacle.

9. The system of claim 1, wherein the server is further configured to:
register a facility or venue.

10. The system of claim 9, wherein registering a facility or venue comprises providing one or more floorplans for the facility or venue for the interactive map for an interior layout of the facility or venue.

11. The system of claim 1, wherein the server is further configured to output the interactive map including the added geospatial location data for the emergency caller and identified escape route to an administrator for the facility or venue.

12. The system of claim 1, wherein an interactive map including the added geospatial location data for the emergency caller and identified route is outputted in response to a query from the emergency responder.

13. A method for providing an automated determination and production of access or escape routes in support of emergency call location data, the method comprising:
maintaining one or more interactive maps depicting an interior layout of one or more facilities or venues stored in a memory storage, wherein each interactive map comprises:
a floorplan of the facility or venue;
a user interface configured to enable a user to view the floorplan and add data to the interactive map; and
one or more potential access or escape routes for the facility or venue; and receiving a request, from an emergency call routing service, for location data for an emergency caller and initiating an automated process comprising;
determining geospatial location data for the emergency caller;
determining when geospatial location data for the emergency caller corresponds to a facility or venue with an interactive map for its interior layout stored in the memory storage;
wherein each interactive map further comprises indications of potential obstacles added using the user interface;
wherein potential obstacles are added to the interactive map by: displaying the one or more floorplans for the facility or venue using the user interface; receiving, from a user via the user interface, an indication of potential obstacles on the displayed floorplan of the facility or venue; and saving the received indication of potential obstacles;
accessing the interactive map for the facility or venue and identifying one or more access or escape routes using the interactive map by determining a most efficient access or escape route between the geospatial location data of the emergency caller indicating their physical location and one or more exits from the facility or venue as indicated by the one or more potential access or escape routes for the facility or venue added to the interactive map;
adding the geospatial location data for the emergency caller and identified route to the interactive map; and
outputting the interactive map including the added geospatial location data for the emergency caller and identified route to an emergency responder at the facility or venue.

14. A system for providing interactive routing in support of emergency call location data, the system comprising:
an emergency call routing service configured to receive, process, and route emergency call;
one or more interactive maps for an interior layout of one or more facilities or venues stored in a memory storage, each interactive map comprising:
one or more floorplans of a facility or venue;
a user interface configured to enable a user to view the one or more floorplans and add data to the interactive map; and
one or more potential access or escape routes for the facility or venue; and an enhanced location service provider in communication with the emergency call routing service and the memory storage storing the one or more interactive maps, the enhanced location service provider configured to:
receive a request, from the emergency call routing service, for location data for an emergency caller;
determine geospatial location data for the emergency caller;
determine if geospatial location data for the emergency caller corresponds to a facility or venue with an interactive map for its interior layout stored in the memory storage;
wherein each interactive map further comprises indications of potential obstacles added using the user interface;
wherein potential obstacles are added to the interactive map by: displaying the one or more floorplans for the facility or venue using the user interface; receiving, from a user via the user interface, an indication of potential obstacles on the displayed floorplan of the facility or venue; and saving the received indication of potential obstacles;
access the interactive map for the facility or venue and identify one or more access or escape routes using the interactive map by determining a most efficient escape route between the geospatial location data of the emergency caller indicating their physical location and one or more entries or exits of the facility or venue as indicated by the one or more potential access or escape routes for the facility or venue added to the interactive map;
add the geospatial location data for the emergency caller and identified route to the interactive map; and output the interactive map including the added geospatial location data for the emergency caller and identified route to an emergency responder at the facility or venue.

* * * * *